(12) United States Patent
Lind et al.

(10) Patent No.: US 7,071,484 B2
(45) Date of Patent: Jul. 4, 2006

(54) DEVICE FOR ACQUIRING INFORMATION CONTAINED IN A PHOSPHOR LAYER (75) Inventors: Martin Lind, Munich (DE); Ralph Thoma, Augsburg (DE); Georg Reiser, Munich (DE); Christian Schulz, Altoetting (DE)

(73) Assignee: AGFA-Gevaert Healthcare GmbH, Leverkusen (DE)

( * ) Notice: Subject to any disclaimer, the term of this patent is extended or adjusted under 35 U.S.C. 154(b) by 0 days.

(21) Appl. No.: 10/795,480

(22) Filed: Mar. 8, 2004

(65) Prior Publication Data
US 2004/0188646 A1   Sep. 30, 2004

(30) Foreign Application Priority Data
Mar. 28, 2003   (EP) .................................. 03100831

(51) Int. Cl.
*G01N 23/04* (2006.01)
(52) U.S. Cl. .................................... 250/586
(58) Field of Classification Search ............... 250/586, 250/587
See application file for complete search history.

(56) References Cited
U.S. PATENT DOCUMENTS
4,258,264 A   3/1981   Kotera et al.
4,369,367 A   1/1983   Horikawa
2004/0135108 A1*   7/2004   Goldman et al. ........... 250/584

FOREIGN PATENT DOCUMENTS
DE   198 59 747 C1   12/1998
EP   0 702 483 A2   3/1996
JP   2000235108   8/2000
JP   2001324615   11/2001

OTHER PUBLICATIONS
"Handbook of Optics", 1978, Walter G. Driscoll, McGraw Hill, NY XP002250125.

* cited by examiner

*Primary Examiner*—David Porta
*Assistant Examiner*—Marcus Taningco
(74) *Attorney, Agent, or Firm*—Milde & Hoffberg, LLP (57) ABSTRACT A device for acquiring information that is contained in a phosphor layer which includes a light source (2) for irradiating and exciting the phosphor layer (1) to produce emission light (4) containing the information, a detector (6) for acquiring the emission light (4) produced in the phosphor layer (1) and a filter device (8), which is arranged between the phosphor layer (1) and the detector (6) and/or between the phosphor layer (1) and the light source (2). To increase the reliability in the acquisition of the emission light (4), the filter device (8) includes at least two filter elements structured as absorption filters and joined to each other.

30 Claims, 3 Drawing Sheets

DEVICE FOR ACQUIRING INFORMATION CONTAINED IN A PHOSPHOR LAYER

BACKGROUND OF THE INVENTION

The invention relates to a device for acquiring information contained in a phosphor layer.

X-rays are taken, especially for medical purposes, by using phosphor layers and having the radiation passing through an object, i.e. a patient, saved as a latent image in the phosphor layer. In order to read out the latent image, the phosphor layer is radiated with excitation light thereby emitting an emission light corresponding to the latent image, which is received by an optical detector and converted into electric signals. If necessary, the electric signals can be further processed and displayed on a monitor or read out by a suitable output device such as a printer for example.

The German Patent No. DE 198 59 747 C1 describes a similar device in which some reflection layers are provided between the phosphor layer and detector. If necessary, an absorption filter for the absorption of the excitation light may also be provided. In this way the excitation light is prevented from reaching the detector, which could adulterate the acquisition of the emission light coming from the phosphor layer. Furthermore, the light source can be fitted with a reflection layer for the reflection of light portions which are not designed or suitable for the excitation of the emission light. In this way such light portions are prevented from impinging on the phosphor layer or other components of the device and from reaching the detector through reflection and/or diffusion, which could also adulterate the acquisition of the emission light.

In general this device facilitates the acquisition of the emission light with high reliability. However, in certain applications, the degree of reliability necessary for that particular application may not always be ensured, for example when using certain types of detectors and/or sources of light and/or certain kinds of phosphor layers.

SUMMARY OF THE INVENTION

It is a principal object of the present invention to provide a device for acquiring information contained in a phosphor layer, with which the highest possible reliability in the acquisition of the emission light is ensured.

This object, as well as other objects which will become apparent from the discussion that follows, are achieved, according to the present invention, by providing a filter device, which is arranged between the phosphor layer and the detector, or between the phosphor layer and the light source, having at least two filter elements structured as absorption filters and joined to each other. In the context of the invention the absorption filters are optical filters, preferably made of glass or plastic, containing light absorbing substances. As light absorbing substances ionic and/or inorganic substances are preferably used.

The combination, according to the invention, of two or more filter elements structured as absorption filters, preferably each with different spectral absorption rates—compared to a single absorption filter or a combination of single reflection filters—results in the following advantages:

(1) A bigger difference in the transparency to the emission light, as compared to the excitation light, is obtained by arranging the filter device at the side of the detector between the phosphor layer and the detector. This ensures that a larger portion of the emission light will reach the detector, while essentially filtering out the excitation light.

(2) A bigger difference in the transparency to the excitation light, as compared to light portions which are not designed or suitable for the excitation of the emission light, is obtained by arranging the filter device between the light source and the phosphor layer. The result here is that a bigger portion of the excitation light enters the phosphor layer and the residual light portions are essentially filtered out.

In both arrangements of the filter device according to the invention a generally higher reliability in the acquisition of the emission light is ensured. Naturally, a particularly high reliability is achieved if both arrangements are combined; i.e., if a filter device structured accordingly is arranged both between the light source and the phosphor layer and also between the phosphor layer and the detector.

Through the joining together, according to the invention, of the individual filter elements in the filter device, which is arranged on an optical path between the phosphor layer and the detector or on an optical path between the phosphor layer and the light source, a configuration of the device is obtained which is also more simple and more compact than with individual separate reflection layers, and if necessary an additional separate absorption layer in the optical paths.

The filter elements are preferably affixed to each other with glue, in particular by means of a bonding layer lying between the individual filter elements and made of glue or cement with a high transparency in the wavelength range of the emission light. Alternatively, the bonding layer can be formed only in some regions of the filter elements. When arranging the filter device on the side of the detector, the material of the layer may exhibit a low transparency for light in the wavelength range of the excitation light, thereby achieving an additional attenuation of the undesired light transmissions. The layer made of glue or cement—as compared to an interim layer of air—prevents reflection losses due to small differences in the refraction indices at the bordering surfaces of the filter elements so that a high transparency is ensured in the wavelength range of the emission light.

Alternatively, the filter elements can be attached to each other by direct contact, where the surfaces of the filter elements are so evenly polished that these are held together when in contact with each other due to atomic or molecular cohesion forces. Through this simple connection technique the entire transmission performance of the filter device is not effected by additional layers of cement or glue.

The filter elements can also be alternatively or additionally held together by means of a mechanical holding device. Through a mechanical connection of the filter elements, a generally more compact and more robust structure is obtained. The holding device is preferably structured as a frame running along the border area of the filter elements, intermittently if necessary. In this way mechanical cohesion is easily obtainable.

In another preferred embodiment of the invention it is provided that the filter device be affixed to the detector in order to achieve a structure of the device as compact as possible. The filter device, similarly to the connection technique mentioned in relation to the filter elements, can be connected to the detector by means of glue or a mechanical holding device such as a frame.

Absorption filters with different spectral absorption rates in general have different thermal expansion coefficients. In such cases the connection of two or more filter elements would cause the entire filter device to bend due to the different thermal expansion of the filter elements with temperature fluctuations. This effect, used with bimetals, would cause undesirable effects in the optical application presented here, such as a modified absorption rate due to tension in the filter elements, increased reflection losses from the surface of the filter elements and warping in the components of the device connected with the filter device. Finally, especially in the case of a filter device connected with a detector, another disadvantage lies in that a deflection of the filter device either causes the detector to bend, or at least exposes it to high tension, which can reduce its sensitivity and consequently its reliability in acquiring the emission light.

In a preferred embodiment of the invention it is provided that at least three of the filter elements are connected with each other and at least two of the filter elements connected with each other exhibit different thermal expansion coefficients, where the filter elements connected with each other are arranged in such a way that at least two pairs of filter elements are obtained from two filter elements respectively with different thermal expansion coefficients and bending forces, which develop in the single pairs of filter elements acting against each other, thereby mutually canceling each other out. In this way a deflection of the filter device due to temperature fluctuations is reduced or prevented.

The filter elements are preferably arranged one after another in such a way that the progression of the thermal expansion coefficients and/or the thickness of the filter elements is symmetrical. In particular it can be provided that between at least two first filter elements, each with a first thermal expansion coefficient, there is arranged at least a second filter element with a second thermal expansion coefficient. The thicknesses of the first filter elements are preferably in the same order of magnitude, and are preferably the same. Alternatively or additionally, the thicknesses of the second filter elements are in the same order of magnitude and are preferably the same. Each individual one of these measures contributes to the improved attenuation or compensation of possible bending forces. A combination of these measures leads accordingly to a more reliable attenuation or compensation of the bending forces.

The filter elements of the filter device structured as absorption filters are developed in such a way that a filter device arranged between the phosphor layer and the detector is substantially transparent in a first wavelength range of the emission light and is substantially non-transparent in a second wavelength range of the excitation light. In this way the adulteration of the emission light to be detected is exhibited. A filter device arranged between the phosphor layer and the detector can be additionally or alternatively substantially non-transparent in a third wavelength range, lying at higher wavelengths than the second wavelength range of the excitation light. In this way the filter device is non-transparent not only in the wavelength range of the excitation light but also additionally in a range above the wavelength range of the excitation light. In this way the ratio, and therefore the contrast, of the emission light transmitted through the filter device is increased with respect to light portions in the wavelength range and above the wavelength range of the excitation light.

In contrast, a filter device arranged between the phosphor layer and the light source is substantially transparent for the light in the second wavelength range of the excitation light and is substantially non-transparent for the light in a third wavelength range of light portions which are not designed or suitable for the excitation of the emission light. In the context of the invention the filter device is non-transparent or transparent, respectively, at a given wavelength if in this wavelength it exhibits a transmittance below $10^{-3}$, in particular below $10^{-4}$, or a transmittance above 0.1, in particular 0.7, respectively.

In a preferred further development of the invention it is provided that:at least a first filter element is transparent in the first wavelength range of the emission light and is non-transparent in a second wavelength range of the excitation light and at least a second filter element is transparent in the first wavelength range of the emission light and is non-transparent in the third wavelength range lying at higher wavelengths than the second wavelength range of the excitation light. Through the combination of different filter elements with such filter characteristics, a contrast is obtained that is further increased as compared to a single filter element, which for manufacturing reasons is mostly non-transparent in only a relatively narrow wavelength region.

In one preferred embodiment of the invention at least one of the filter elements includes a first reflection layer which is non-transparent for light in a fourth wavelength range lying at higher wavelengths than the second wavelength range and which partially overlaps, in particular with the second wavelength range. Alternatively or additionally, at least one of the filter elements includes a second reflection layer which is non-transparent for light in a fifth wavelength range lying at higher wavelengths than the second wavelength range and which partially overlaps, in particular with the third wavelength range and/or fourth wavelength range. By means of one or more first and/or second reflection layers the transparency of the filter device is cancelled out in at least one additional wavelength range, preferably lying between the second and the third wavelength range, which in general leads to a further increase in contrast.

It is preferred that the third wavelength range overlaps with the second wavelength range or directly borders with the second wavelength range. The filter device is then non-transparent for light in a very wide wavelength range composed of the second wavelength range and the third wavelength range bordering with it. This is particularly advantageous in applications in which a long-wave florescent radiation is activated in the phosphor layer, which would affect the acquisition of the emission light detected in lower wavelengths. The bordering of the third wavelength range with the second wavelength range is preferably obtained through the adequate choice and combination of first and second filter elements, in particular absorption filters with different transmission rates. If this cannot be obtained through the combination of filter elements, the filter device is additionally fitted with one or more first and/or second reflection layers described above.

For a full understanding of the present invention, reference should now be made to the following detailed description of the preferred embodiments of the invention as illustrated in the accompanying drawings.

DESCRIPTION OF THE PREFERRED EMBODIMENTS

The preferred embodiments of the present invention will now be described with reference to FIGS. 1–5(f) of the drawings. Identical elements in the various figures are designated with the same reference numerals.

Figure 1:
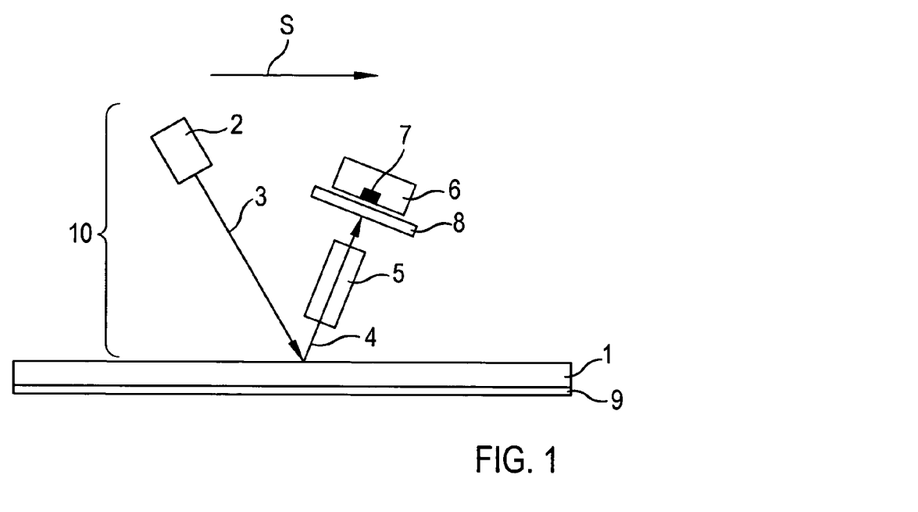
FIG. 1 is a representational diagram showing the general nature of the device according to the present invention.

FIG. 1 illustrates an exemplary embodiment of the device according to the present invention. The latent x-ray image that is stored in a phosphor layer 1 is acquired using a scanning head 10, which is moved across the phosphor layer 1 in the scan direction S. In other embodiments, the phosphor layer 1 may be moved in addition or alternatively to the scanning head 10, which will also allow detection of different areas of the phosphor layer 1. To provide mechanical stability, the phosphor layer 1 is applied to a carrier layer 9.

An excitation light 3 emitted by a light source 2 strikes the phosphor layer 1 and excites emission light 4 on and/or in the phosphor layer 1; said emission light 4 is guided to the detector 6 or focused onto the detector 6 using a light-guiding or focusing optics 5.

Arranged between the phosphor layer 1 and the detector 6 is a filter device 8, which exhibits a high transparency in a first wavelength range of the emission light 4 and which is essentially non-transparent in a second wavelength range of the excitation light 3, i.e., exhibits only a very low transparency for the excitation light 3. The filter device 8 is designed such that it is non-transparent in at least one additional wavelength range, which is located at longer wavelengths than the second wavelength range of the excitation light 3. Preferably, the filter device 8 is attached to the detector 6 to achieve a very compact design.

The filter device 8, designed in this manner, accomplishes that neither the excitation light 3 that is reflected at the phosphor layer 1 and/or at the carrier layer 9 nor the light in the third wavelength range above the wavelength range of the excitation light can reach the detector 6.

Light portions in the third wavelength range may be caused by longer-wave portions of the radiation spectrum of light source 2, which are not intended or not suitable for the excitation of emission light 4 in the phosphor layer 1. In addition, such light portions can occur at certain types of phosphor layers, where—in addition to the emission light 4 to be measured at shorter wavelengths than the excitation light—additional fluorescence light is excited through the excitation light 3 at longer wavelengths than the excitation light 3. However, such longer-wave fluorescence light portions are not desired, because in general they do not contain image information and can lead to falsification of the image information to be obtained.

Through respectively designed filter devices 8, generally only the emission light 4 in the first wavelength area emitted by the phosphor layer 1 will be acquired, such that a high degree of reliability and accuracy can be ensured when acquiring the emission light 4.

Preferably, the light source 2 exhibits laser diodes, which are arranged along a line that is perpendicular to the plane of the Figure such that the divergent light beam bundles that emit from the individual laser diodes overlap and illuminate a line-shaped or stripe-shaped area that is parallel to the direction of the line on the phosphor layer 1. As an option for focusing the excitation light 3, a cylinder lens that runs in the direction of the line may be provided, which affects focusing of the excitation light 3 onto the phosphor layer 1 and enables overlapping of the individual beams of adjacent laser diodes in the direction of the line. In this manner, only a small line on the phosphor layer 1 is illuminated with an essentially constant intensity in the direction of the line. In place of the laser diodes, the light source 2 may also exhibit other means of illumination, in particular high-intensity light emitting diodes (LEDs) in a linear arrangement.

The detector 6 includes light-sensitive elements 7, preferably one or several linear CCD arrays, which are arranged in a line that runs perpendicular to the plane of the Figure. As an alternative, photodiode cells may be used as light sensitive elements 7.

In the exemplary embodiment presented here, both the light source 2 and the detector 6 are located on the same side of the phosphor layer 1. For applications where the carrier layer 9 is transparent, the light source 2 may be located on one side of the phosphor layer 1 and the detector 6 on the opposite side of the phosphor layer 1. With this design, the filter device 8 may be arranged between the phosphor layer 1 and the detector 6 or may be located at— or integrated in—the transparent carrier layer 9.

In an alternative embodiment of the present invention, the device may be designed as a so-called flying spot scanner. In such an embodiment, the light source 2 includes a laser and a rotating polygon mirror, where the laser beam 3 of the laser is reflected in the direction of the phosphor layer 1. Due to the rotation of the polygon mirror, the laser beam 3 scans differing locations on the phosphor layer 1, which are successively excited to emit luminescent light. The emission light emitting from the excited spots on the phosphor layer 1 is detected by the detector 6. The detector 6 may be designed for detection of a localized or non-localized resolution. In the latter case, preferably one or several photomultiplier tubes (PMTs) are used as a detector 6. In this embodiment, the filter device 8 is located between phosphor layer 1 and detector 6 as well, in order to properly filter the light 4 that is emitted by the phosphor layer 1 before it is detected by the detector 6. Light fibers, for example, may be employed as light-guiding or focusing optics 5, which guide the light 4 that is emitted by the various locations of the phosphor layer 1 to the detector 6.

In one embodiment of the device, the filter device 8 comprises at least two different filter elements, of which at least one first filter element is transparent in the first wavelength range of the emission light 4 and non-transparent in the second wavelength range of the excitation light 3, and at least a one second filter element is transparent in the first wavelength range of the emission light 4 and non-transparent in the third wavelength range above the second wavelength range of the excitation light 3. In this manner, a greater contrast, i.e., a greater transparency for emission light 4 in relation to the transparency for the excitation light 3, including light portions with greater wavelengths, is achieved than would generally be the case with filter devices consisting of only one filter element.

Figure 2:
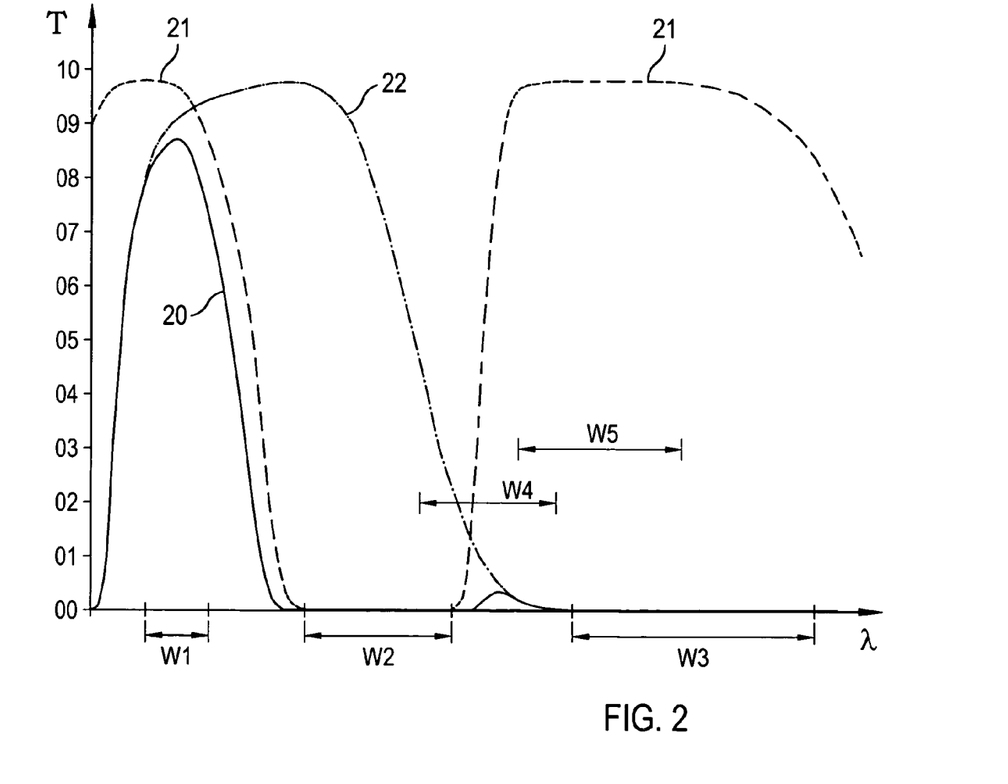
FIG. 2 is a graph showing the spectral transmittance of the filter device as well as single filter elements and reflection layers used in the device according to the present invention.

FIG. 2 shows examples for the spectral degree of transmission of a filter device 8 and of its individual filter elements. The diagram presents the respective degree of transmission T in relation to the wavelength $\lambda$. The transmission plot 21 of the first filter element shows in the first wavelength range W1 of the emission light a very high transparency, and in the second wavelength range W2 of the excitation light a very low transparency, which, however, increases towards the longer wavelengths. The transmission plot 22 of the second filter element shows in the first wavelength range W1 a very high transparency as well, which drops to very low values only in a third wavelength range W3, which is located at longer wavelengths than the second wavelength range W2 of the excitation light.

As can be seen from the diagram, the first wavelength range W1 of the emission light is preferably located at shorter wavelengths than the second wavelength range W2 of the excitation light.

The first wavelength range W1 is preferably located between about 380 nm and 420 nm, because most types of phosphor layers will emit the greatest portion of the emission light in this range. The second wavelength range W2 lies between 520 nm and 700 nm, in particular between 630 nm and 690 nm. When using laser diodes as the light source, the by far greatest portion of the emitted excitation light will be in a narrow wavelength range around the wavelength of the laser, preferably at 660 nm. The degree of transmission T in the second wavelength range W2 of the excitation light is preferably under $10^{-8}$, such that the excitation light, which typically exhibits an intensity that is by several magnitudes greater compared to the emission light to be detected, is reduced very reliably.

Absorption filters of the company SCHOTT GLASS, D-55122 Mainz, Germany with the product designation BG 3, BG 4 and BG 12, or BG 18, BG 39 and BG 42, respectively, are suitable for the first and second filter elements, for example.

Combining the first and the second filter element in the filter device results in the transmission plot 20 of the filter device exhibiting high degrees of transmission in the first wavelength range W1 and non-transparency for light in both the light wavelength range W2 of the excitation light and for light in the third wavelength range W3 above the wavelength range W2.

Preferably, the filter elements are designed as absorption filters, which absorb the light in the second wavelength range W2 of the excitation light, or in the third wavelength range W3. Optical filters made of glass or synthetics with light-absorbing ionic and/or inorganic compounds are used as absorption filters.

By combining at least two filter elements designed as absorption filters, each with a different spectral absorption behavior, it is possible to achieve particularly high contrasts of the transmitted emission light in the first wavelength range W1 in relation to light portions transmitted in the second and third wavelength ranges W2 and W3.

To increase the contrast even further, at least one of the filter elements may be provided with a first reflection layer, which reflects a great portion of the light in a fourth wavelength range W4, and in this way is essentially non-transparent for light in this wavelength range. The fourth wavelength range W4 is located at longer wavelengths than the second wavelength range W2, overlaps with it, and lies preferably between 650 nm and 780 nm. An explicit presentation of the transmission plot of the first reflection layer has been omitted for purposes of better clarity. The transparency of the filter device can be reduced further in an additional wavelength range through this first reflection layer in order to achieve sufficiently small degrees of transmission T there as well. In the shown example, this wavelength range is located between the wavelength ranges W2 and W3.

In addition or alternative to the first reflection coating, at least one of the filter elements may exhibit a second reflection layer that to a large degree reflects the light in a fifth wavelength range W5, thus being essentially non-transparent for light in this wavelength range. The fifth wavelength range W5 is located at longer wavelengths than the second wavelength range W2 of the excitation light and overlaps, at least partially, in particular with the third and/or fourth wavelength range W3 or W4, respectively. Preferably, the fifth wavelength range W5 is between 750 nm and 910 nm. The second reflection layer also leads to an additional reduction in the transparency for the filter device in a wavelength range between the second wavelength range and the third wavelength range W2 and W3. Here too, an explicit presentation of the transmission plot of the second reflection layer has been omitted for purposes of clarity.

The preferred reflection layers used in this device are layer systems consisting of several thin di-electric layers, each with a different refractive index and thickness. Due to interference effects, the light that strikes such a layer system is reflected or transmitted depending on the incident angle and the wavelength.

Preferably, the position of the third wavelength range W3 is selected such that it directly borders on, or overlaps, the second wavelength range W2 of the excitation light as shown in dashed lines for the wavelength range W3'. The filter device is then non-transparent for light portions in a very broad wavelength range from the second wavelength range W2 up to and including the adjacent third wavelength range W3. This is of particular advantage in applications, where longer-wave fluorescence radiation is excited in the phosphor layer, which would influence the measurement of the emission light that is emitted at lower wavelengths.

Bordering of the third wavelength range W3 on the second wavelength range W2 is achieved, for example, through a suitable selection and combination of first and second filter elements with the corresponding transmission plots 21 and 22. If this cannot be achieved through a combination of filter elements alone, the filter device will be provided additionally with one or several of the first and/or second reflection layers described above.

FIG. 3 shows several preferred embodiments of a filter device comprised of two filter elements.

Figure 3A:
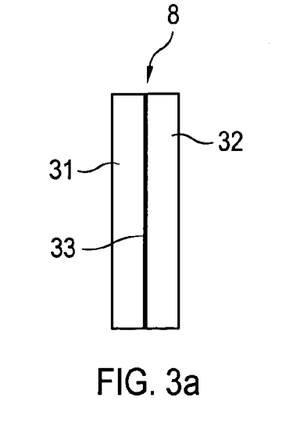
FIGS. 3(a)–3(d) show preferred embodiments of a filter device comprised of two filter elements according to the present invention.

In the embodiment of a filter device 8 shown in a cross-sectional view in FIG. 3a, a first filter element 31 and a second filter element 32 are glued together using a layer 33 of a bonding agent or cement with a high transparency in the first wavelength range W1 of the emission light. Preferably, the material of the layer 33 exhibits a low transparency for light in the second and/or third wavelength range W2 and W3. The layer 33 consisting of a bonding agent or a cement reduces reflection losses—as compared to a layer of air— due to smaller differences in the refractive indices at the bordering surfaces of the filter elements 31 and 32 to the layer 33, such that a high transparency in the first wavelength range W1 of the emission light is ensured.

Figure 3B:
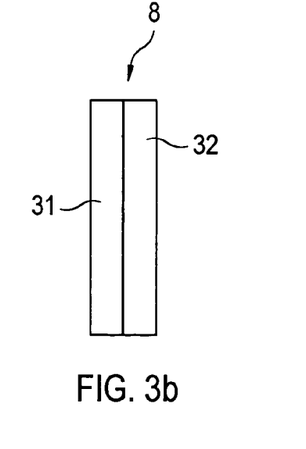

In an alternative design shown in FIG. 3b, the two filter elements 31 and 32 of the filter device 8 are joined to one another by direct bonding. To this end, the surfaces of the filter elements 31 and 32 are polished smoothly, such that they are held together at contact due to atomic or molecular cohesion forces. With this simple connection technology, the entire transmission behavior of the filter device 8 is not influenced by additional layers of cement or bonding agents.

Figure 3C:
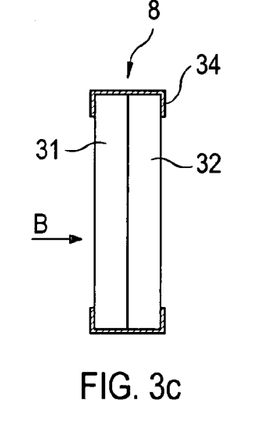
Figure 3D:
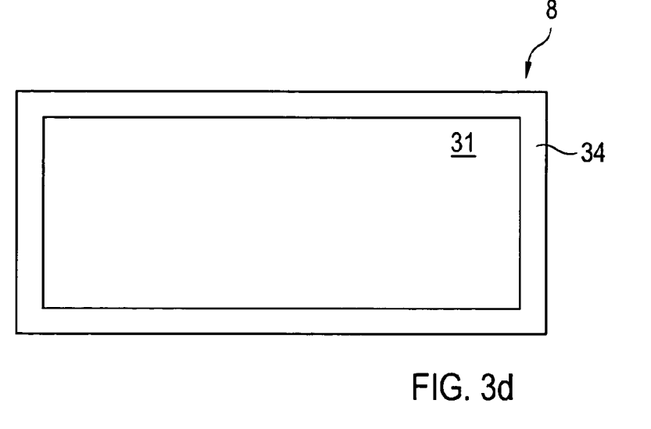

FIG. 3c presents a cross-section of an additional exemplary embodiment of a filter device 8, where the filter elements are held together by a frame 34 that is situated at the edges of the two filter elements 31 and 32. FIG. 3d shows a top view of such a filter device 8 in the direction B. As can be seen, the frame 34 presented here runs along the entire edge area of the two filter elements 31 and 32. Depending on the application, it may be sufficient if a respective frame 34 runs only in certain sections of the edges, for example in the section of individual corners of the filter device 8. Using such a frame ensures a particularly robust connection of the individual filter elements 31 and 32.

With respect to the preferred optical properties of the first and second filter elements 31 and 32, the designs with regard to FIGS. 1 and 2 apply accordingly.

FIG. 4 shows cross-sections of several different preferred embodiments of a filter device comprised of three filter elements.

Figure 4A:
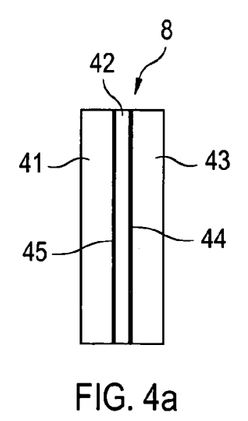
FIGS. 4(a)–4(c) show preferred embodiments of a filter device comprised of three filter elements according to the present invention.

In the example of FIG. 4*a*, a second filter element 42 is located between two first filter elements 41 and 43, and glued or cemented to them using layers 44 and 45 consisting of a bonding agent or cement. To ensure as little weakening of the emission light that is to be transmitted as possible, the layers 44 and 45 exhibit a high transparency for light in the first wavelength range W1 of the emission light. Preferably, the material of the layer 44 and/or 45 also exhibits a low transparency for light in the second and/or third wavelength range W2 and W3. As has already been explained extensively in connection with the exemplary embodiment of FIG. 3, layers 44 and 45 reduce the reflection losses at the border surfaces between the first and the second filter elements 41 and 43 or 42, and the layers 44 or 45, such that in this case a high transparency of the filter element 8 is ensured in the first wavelength range W1 of the emission light.

The two first filter elements 41 and 43 are preferably transparent in the first wavelength range W1 of the emission light and are non-transparent in the second wavelength range W2 of the excitation light. The second filter element 42, located between these two filter elements, is also transparent in the first wavelength range W1 of the emission light and non-transparent in the third wavelength range W3, which is located at longer wavelengths than the second wavelength range W2.

Such a combination of filter elements, in particular those designed as absorption filters, each with different spectral absorption behaviors, accomplishes the advantages already mentioned in connection with the embodiments of FIGS. 1 and 2.

Absorption filters with differing spectral absorption behaviors will typically exhibit different thermal expansion coefficients. In such cases, a connection of two or more differing filter elements would lead to bending of the entire filter device due to different thermal expansions of the filter elements during temperature fluctuations. This effect, which is utilized for bimetals, would lead to undesired effects for the optical application at hand, such as altered absorption behavior due to tensions in the filter elements, heightened reflection losses at the surfaces of the filter elements and tensioning of the components of the device that are connected with the filter device. The latter is particularly disadvantageous for a detector connected with a filter device, because when the filter device bends, the detector is either bent or at least exposed to high tension, which can reduce its sensitivity and as a result the reliability when measuring the emission light. For this reason, in the exemplary embodiment shown in FIG. 4*a*, the two first filter elements 41 and 43, each with a first thermal expansion coefficient, and the second filter element 42 with a second thermal expansion coefficient are arranged such that two filter element pairs 41/42 and 42/43 with differing thermal expansion coefficients are obtained and the bending forces that occur in the individual filter element pairs 41/42 and 42/43 during temperature changes, work against each other, and in particular cancel each other. This prevents bending of the filter device 8 due to different thermal expansions of the first filter elements 41 and 43 on the one hand and the second filter element 42 on the other hand.

The symmetrical sequence of the filter elements 41, 42 and 43 with differing thermal expansion coefficients and thicknesses as shown here has the effect that potentially occurring bi-metal effects of the respective filter element pairs 41/42 or 43/42 compensate each other in a very reliable manner.

Figure 4B:
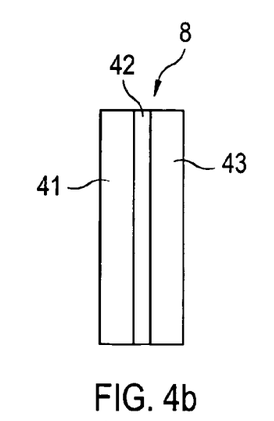

The filter device 8 shown in FIG. 4*b* is designed in the same manner as the bone shown in FIG. 4*a*, whereby the individual filter elements 41, 42 and 43 are not bonded together through additional layers 44 and 45, but through direct contact bonding. In all other respects, the same information given for the example in FIG. 4*a* applies to this filter device 8 as well. The filter device 8 shown in FIG. 4*c* corresponds in its design essentially to the filter device shown in FIG. 4*a* as well; the information given with regard to FIG. 4*a* applies accordingly. In addition to the layers 44 and 45, a frame 46 that runs in the area of the filter elements 41, 42 and 43 provides increased mechanical coherence of the individual filter elements 41, 42 and 43. As has already been explained in greater detail for the embodiment shown in FIGS. 3*c* and 3*d*, the frame 46 may be provided only in individual sections of the edges of the filter elements 41, 42 and 43, preferably in the area of individual corners.

Figure 4C:
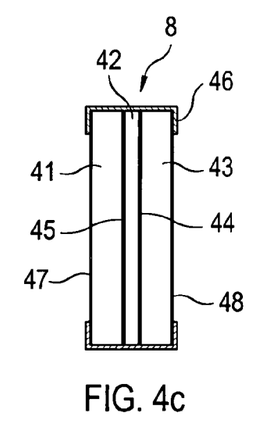

In addition to the filter design shown in FIG. 4*a*, the filter device 8 of FIG. 4*c* also exhibits a first reflection layer 47, where light in a fourth wavelength range W4 is reflected to a large degree, with said fourth wavelength range being located above the second wavelength range W2 of the excitation light and in particular overlapping partially with said second wavelength range W2. In the shown example, this first reflection layer 47 is applied to the outer side of one of the two first filter elements 41.

On the outer side of the other of the two first filter elements 43, a second reflection layer 48 is applied, where light in a fifth wavelength range W5 is reflected to a large degree with said fifth wavelength range, located above the second wavelength range W2 of the excitation light, and in particular overlapping partially with said third and/or fourth wavelength range W3 and W4.

As has already been explained in connection with FIG. 2, one or several additional reflection layers 47 or 48 on the absorption filters 41 to 43 can achieve a particularly high contrast ratio of transmitted emission light to transmitted light portions in other wavelength ranges.

It is preferable to arrange the filter device 8 between phosphor layer 1 and detector 6 such that the light emitted from the phosphor layer 1, which initially includes other light portions in addition to the emission light 4 to be detected, is initially reflected at the second reflection layer 48 before it runs through the subsequent filter elements 43, 42 and 41 that are designed as absorption filters in the sequence mentioned. This significantly reduces heat generation in the individual filter elements, in particular in the second filter element 42, due to the absorption of the longer-wave, in particular infrared radiation components. Also reduced are thermal expansion effects.

FIGS. 5*a* to 5*f* show further preferred embodiments of filter devices comprised of three to five filter elements.

Figure 5A:
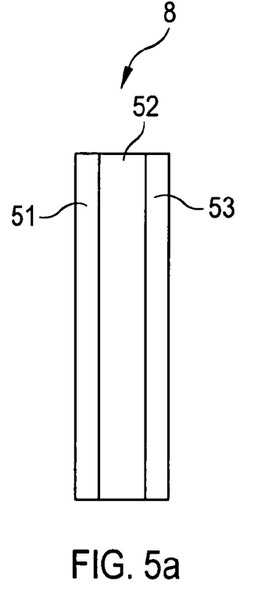
FIGS. 5(a)–5(f) show preferred embodiments of a filter device comprised of three to five filter elements according to the present invention.

The filter device 8 shown in FIG. 5*a* corresponds in its basic design to the one shown in FIG. 4*b*, whereby a second filter element 52 with a second thermal expansion coefficient is arranged between two first filter elements 51 and 53, each with a first thermal expansion coefficient. Different from the filter device shown in FIG. 4b, the second filter element 52 exhibits here a greater thickness than the two first filter elements 51 and 53. These thickness ratios also ensure that bending forces that occur in the respective filter element pairs 51/52 and 52/53 compensate one another, thus avoiding bending of the filter device 8.

Figure 5B:
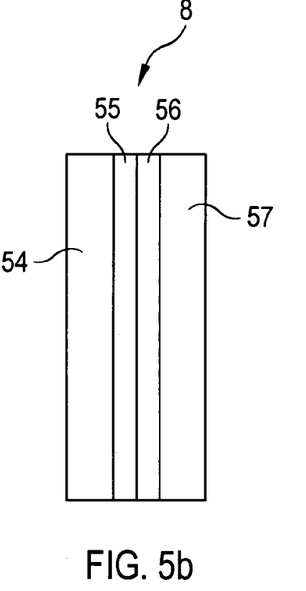

FIG. 5b shows a filter device 8 that is comprised of four filter elements 54 to 57. Here, the two first filter elements 54 and 57 exhibit a first thermal expansion coefficient; the two second filter elements 55 and 56 exhibit a second thermal expansion coefficient. The symmetrical sequence of the individual filter elements 54 to 57, each with differing thermal expansion coefficients, also prevents bending of the filter device 8 because the bending forces occurring in the individual filter element pairs 54/55 and 56/57 cancel each other.

Figure 5C:
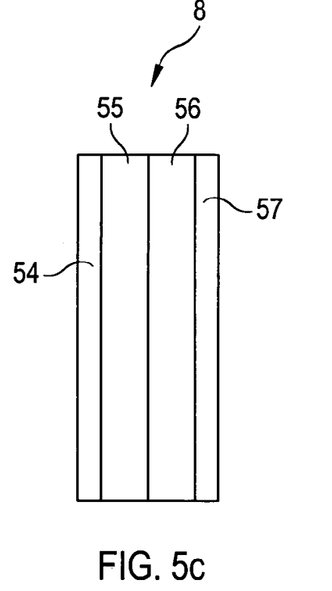

For the filter device 8 presented in FIG. 5c, the same information that has been presented for the embodiment presented in FIG. 5b applies accordingly, whereby only the thicknesses of the first and the second filter elements 55 and 56 as well as 54 and 57 have the reverse relation to each other.

For a particularly reliable compensation of potential bending forces, it is essential that the thicknesses of the first filter elements 54 and 57 are within the same range and in particular are the same, and the thicknesses of the second filter elements 55 and 56 are within the same range, or in particular are the same.

Figure 5D:
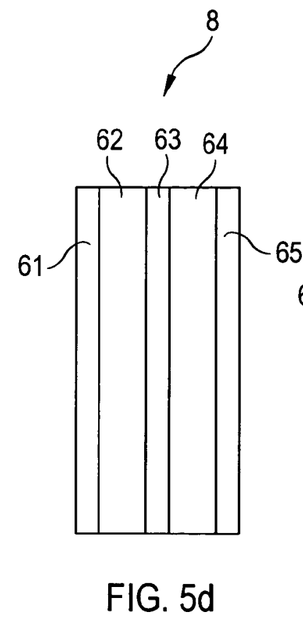

FIG. 5d shows an another preferred embodiment of a filter device 8, which is comprised of five filter elements 61 to 65. The two first filter elements 61 and 65 exhibit a first thermal expansion coefficient, the two second filter elements 62 and 64 exhibit a second expansion coefficient and the third filter element 63 exhibits a third expansion coefficient. In this example too, the individual filter elements 61 and 65, 62 and 64 as well as 63, each with differing thermal expansion coefficients, are arranged in a symmetrical sequence such that potential bending forces compensate each other in the filter element pairs 61/62, 62/63, 63/64 and 64/65, thus preventing thermally based bending of the filter device 8.

In this example, the first and second filter elements 61 and 65, and 62 and 64 are arranged symmetrically around the third filter element 63. Furthermore, the third filter element 63 exhibits a third thermal expansion coefficient, which is different from the first and second expansion coefficients of the first and second filter elements 61 and 65, and 62 and 64. Alternatively, the third filter element may also exhibit a thermal expansion coefficient that is identical to the first or second thermal expansion coefficient of the first and second filter elements 61 and 65, and 62 and 64. Compensation of the bending forces is also ensured with this alternative design.

Figure 5E:
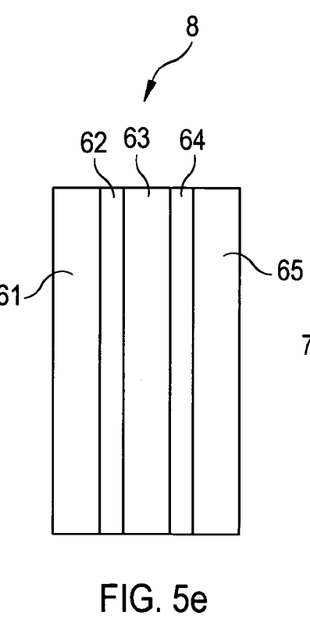

The information for the embodiment shown in FIG. 5d applies correspondingly also to the filter device 8 shown in FIG. 5e, whereby as an alteration the reverse conditions in thicknesses of the first, second and third filter elements 61 and 65, and 62 and 64, as well as 63 have been selected. As has already been stated above, a particularly reliable compensation of bending forces is achieved for this case as well, if the thicknesses of the first and/or second filter elements 61 and 65, and 62 and 64 each are within the same range or particularly if these thicknesses are the same.

Figure 5F:
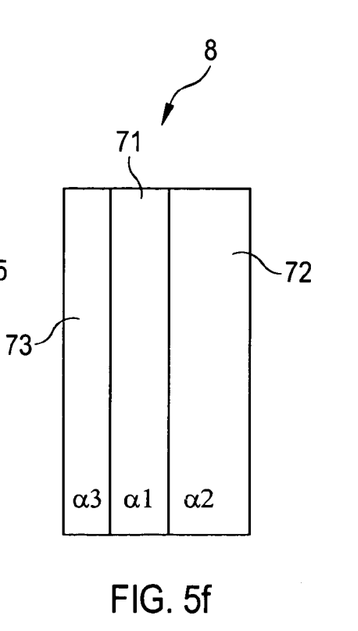

FIG. 5f shows an additional preferred embodiment for a filter device comprised of a first filter element 71 with a first thermal expansion coefficient $\alpha 1$, a second filter element 72 with a second thermal expansion coefficient $\alpha 2$ and a third filter element 73 with a third thermal expansion coefficient $\alpha 3$, wherein the first expansion coefficient $\alpha 1$ is smaller than the second expansion coefficient $\alpha 2$ and the second expansion coefficient $\alpha 2$ is smaller than the third expansion coefficient $\alpha 3$; that is: $\alpha 1 < \alpha 2 < \alpha 3$. The sequence of the individual filter elements is selected such that bending forces in the individual filter element pairs 71/72 and 71/73 work against each other, and in particular cancel each other. As the present case indicates, the sequence of the thermal expansion coefficients $\alpha 3$, $\alpha 1$ and $\alpha 2$ of the individual filter elements 73, 71 and 72 is not symmetrical. In addition, the sequence of the thicknesses of the individual filter elements 73, 71 and 72 does not need to be symmetrical. For sufficient compensation of the bending forces, it is sufficient if the thicknesses of the individual filter elements 73, 71 and 72 are within the same range.

For reasons of clarity, the explicit presentation of layers with a bonding agent or with cement and with frames has been omitted in the examples of FIGS. 5a to 5f. In general, the individual filter elements of these examples can be connected to one another through each of the connection options described above, such as gluing, cementing, direct contact bonding and/or by using a frame.

There has thus been shown and described a novel device for acquiring information contained in a phosphor layer which fulfills all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is limited only by the claims which follow.

What is claimed is:

1. In a device for acquiring latent image information contained in a phosphor layer, said device comprising:
    (a) a light source for irradiating the phosphor layer with excitation light that is suitable for exciting emission light in the phosphor layer, said emission light having a first wavelength range (W1) and said excitation light having a second wavelength range (W2);
    (b) a detector for detecting the emission light that has been excited in the phosphor layer; and
    (c) a filter device, arranged between at least one of the (1) phosphor layer and the detector and (2) the phosphor layer and the light source,
    the improvement wherein the filter device comprises at least three absorption filter elements, which are joined to one another, and wherein at least two of the filter elements that are joined to one another exhibit differing coefficients of thermal expansion, the filter elements that are joined to one another being arranged such that:
    (i) at least two filter element pairs are each obtained from two filter elements with differing thermal expansion coefficients, wherein at least one second filter element with a second thermal expansion coefficient is arranged between at least two first filter elements, each with a first thermal expansion coefficient; and
    (ii) bending forces, which occur at temperature changes in the individual filter element pairs, work against each other and tend to cancel each other out;
    and wherein the thicknesses of the first filter elements are all the same order of magnitude.

2. Device according to claim 1, wherein said at least three filter elements are joined together by gluing.

3. Device according to claim 1, wherein said at least three filter elements are joined together by direct contact bonding.

4. Device according to claim 1, wherein said at least three filter elements are joined together by means of a holding device.

5. Device according to claim 4, wherein the holding device includes a frame that extends along edge areas of the filter elements.

6. Device according to claim 1, wherein the filter device is attached to the detector.

7. Device according to claim 1, wherein the filter elements are arranged one after the other such that the sequence of the thermal expansion coefficients of the filter elements is substantially symmetrical.

8. Device according to claim 1, wherein the filter elements are arranged one after the other such that the sequence of the thicknesses of the filter elements is substantially symmetrical.

9. Device according to claim 1, wherein the thicknesses of the first filter elements are substantially the same.

10. In a device for acquiring latent image information contained in a phosphor layer, said device comprising:
  (a) a light source for irradiating the phosphor layer with excitation light that is suitable for exciting emission light in the phosphor layer, said emission light having a first wavelength range (W1) and said excitation light having a second wavelength range (W2);
  (b) a detector for detecting the emission light that has been excited in the phosphor layer; and
  (c) a filter device, arranged between at least one of the (1) phosphor layer and the detector and (2) the phosphor layer and the light source,
the improvement wherein the filter device comprises at least three absorption filter elements, which are joined to one another, and wherein at least two of the filter elements that are joined to one another exhibit differing coefficients of thermal expansion, the filter elements that are joined to one another being arranged such that:
  (i) at least two filter element pairs are each obtained from two filter elements with differing thermal expansion coefficients, wherein at least one second filter element with a second thermal expansion coefficient is arranged between at least two first filter elements, each with a first thermal expansion coefficient; and
  (ii) bending forces, which occur at temperature changes in the individual filter element pairs, work against each other and tend to cancel each other out;
  and wherein the thicknesses of the second filter elements are all the same order of magnitude.

11. Device according to claim 10, wherein the thicknesses of the second filter elements are substantially the same.

12. Device according to claim 10, wherein said at least three filter elements are joined together by gluing.

13. Device according to claim 10, wherein said at least three filter elements are joined together by direct contact bonding.

14. Device according to claim 10, wherein said at least three filter elements are joined together by means of a holding device.

15. Device according to claim 14, wherein the holding device includes a frame that extends along edge areas of the filter elements.

16. Device according to claim 10, wherein the filter device is attached to the detector.

17. Device according to claim 10, wherein the filter elements are arranged one after the other such that the sequence of the thermal expansion coefficients of the filter elements is substantially symmetrical.

18. Device according to claim 10, wherein the filter elements are arranged one after the other such that the sequence of the thicknesses of the filter elements is substantially symmetrical.

19. In a device for acquiring latent image information contained in a phosphor layer, said device comprising:
  (a) a light source for irradiating the phosphor layer with excitation light that is suitable for exciting emission light in the phosphor layer, said emission light having a first wavelength range (W1) and said excitation light having a second wavelength range (W2);
  (b) a detector for detecting the emission light that has been excited in the phosphor layer; and
  (c) a filter device, arranged between at least one of the (1) phosphor layer and the detector and (2) the phosphor layer and the light source,
  the improvement wherein the filter device comprises at least two absorption filter elements, which are joined to one another; wherein the filter device is substantially transparent in a first wavelength range (W1) of the emission light and is substantially non-transparent in a second wavelength range (W2) of the excitation light; and wherein the filter device is substantially non-transparent in at least a third wavelength range (W3) that is located at longer wavelengths than the second wavelength range (W2) of the excitation light.

20. Device according to claim 19, wherein the filter device comprises at least two filter elements, wherein at least a first one of the filter elements is substantially transparent in the first wavelength range (W1) of the emission light and is substantially non-transparent in the second wavelength range (W2) of the excitation light, and
  wherein at least a second one of the filter elements is substantially transparent in the first wavelength range (W1) of the emission light and is substantially non-transparent in the third wavelength range (W3), which is located at longer wavelengths than the second wavelength range (W2) of the excitation light.

21. Device according to claim 20, wherein at least one of the filter elements includes a second reflection layer that is substantially non-transparent for light in a fifth wavelength range (W5), which is located at longer wavelengths than the second wavelength range (W2) and which partially overlaps with the third wavelength range (W3).

22. Device according to claims 21, wherein at least one of the filter elements includes a first reflection layer that is substantially non-transparent for light in a fourth wavelength range (W4), which is located at longer wavelengths than the second wavelength range (W2), and wherein the fifth wavelength range (W5) partially overlaps with the fourth wavelength range (W4).

23. Device according to claim 19, wherein at least one of the filter elements includes a first reflection layer that is substantially non-transparent for light in a fourth wavelength range (W4), which is located at longer wavelengths than the second wavelength range (W2).

24. Device according to claim 23, wherein the fourth wavelength range (W4) partially overlaps with the second wavelength range (W2).

25. Device according to claim 19, wherein the third wavelength range (W3) overlaps with the second wavelength range (W2).

26. Device according to claim 19, wherein the filter device at wavelengths in the first wavelength range (W1) exhibits a degree of transmission (T) that is greater than 0.1.

27. Device according to claim 19, wherein the filter device at wavelengths in at least one of the second wavelength range (W2) and the third wavelength range (W3) exhibits a degree of transmission (T) that is less than $10^{-3}$.

28. Device according to claim 19, wherein the third wavelength range (W3) borders on the second wavelength range (W2).

29. Device according to claim 19, wherein the filter device at wavelengths in the first wavelength range (W1) exhibits a degree of transmission (T) that is greater than 0.7.

30. Device according to claim 19, wherein the filter device at wavelengths in at least one of the second wavelength range (W2) and the third wavelength range (W3) exhibits a degree of transmission (T) that is less than $10^{-4}$.

* * * * *